United States Patent [19]

Bloemendaal et al.

[11] Patent Number: 5,400,200
[45] Date of Patent: Mar. 21, 1995

[54] MAGNETIC HEAD SUSPENSION APPARATUS

[75] Inventors: John F. Bloemendaal, Rochester; James W. Cannon, Penfield, both of N.Y.

[73] Assignee: Eastman Kodak Company, Rochester, N.Y.

[21] Appl. No.: 944,588

[22] Filed: Sep. 14, 1992

[51] Int. Cl.6 .......... G11B 5/48; G03B 17/24; G03B 21/50

[52] U.S. Cl. .......... 360/104; 360/3; 354/105; 352/92

[58] Field of Search .......... 354/105, 106; 352/27, 352/29, 30, 92, 37, 224, 236; 360/104, 3, 130.21

[56] References Cited

U.S. PATENT DOCUMENTS

| | | | |
|---|---|---|---|
| 3,769,464 | 10/1973 | Jinsenji et al. | 179/100.2 |
| 3,888,570 | 6/1975 | Stella | 352/29 |
| 3,902,797 | 9/1975 | Thomas | 352/29 |
| 3,905,690 | 9/1975 | Scholz | 352/27 |
| 4,176,381 | 11/1979 | de Niet et al. | 360/77 |
| 4,639,796 | 1/1987 | Solhjell | 360/77 |
| 5,028,940 | 7/1991 | Pearson | 354/75 |
| 5,034,836 | 7/1991 | DeMarti, Jr. et al. | 360/104 |
| 5,136,318 | 8/1992 | Aoshima | 354/105 |
| 5,155,511 | 10/1992 | Tamamura | 354/105 |
| 5,170,198 | 12/1992 | Cannon | 354/105 |

FOREIGN PATENT DOCUMENTS

| | | | |
|---|---|---|---|
| 03-200130 | 9/1991 | Japan | 354/105 |
| 04-229851 | 8/1992 | Japan | 360/3 |
| 9102292 | 2/1991 | WIPO | |

*Primary Examiner*—Stuart S. Levy
*Assistant Examiner*—Paul J. Ditmyer
*Attorney, Agent, or Firm*—Frank Pincelli

[57] ABSTRACT

A magnetic head suspension apparatus for reading and/or recording information during photofinishing of photographic filmstrips comprises an elongated pivotally mounted follower bar having a pair of magnetic heads attached thereto in a predetermined orientation with the information tracks on the filmstrip. A pair of film edge followers are pivotally attached to the ends of the bar respectively. A spring is connected between the bar and a fixed support to bias the bar to urge the edge followers into engagement with the film edges of the filmstrip.

17 Claims, 2 Drawing Sheets

MAGNETIC HEAD SUSPENSION APPARATUS

BACKGROUND OF THE INVENTION

1. Field of the Invention

This invention relates to magnetic recording apparatus and more specifically to a magnetic head suspension and follower assembly for use in reading information from and recording information on photographic film during photofinishing operations.

2. Description of the Prior Art

Manufacturers of photographic filmstrips have placed magnetically coded information along one or more of the edges of the filmstrip at a specified distance from the edges of the filmstrip to supply information about the filmstrip to devices contained within photographic printers. The devices use the coded information to produce better quality prints.

The width of the filmstrip changes as the filmstrip ages and as the filmstrip is processed. Various filmstrip manufacturers have different manufacturing tolerances causing the filmstrip to have various widths. Thus one of the difficulties of the prior art was locating the position of the filmstrip magnetic tracks.

U.S. Pat. No. 5,041,933 entitled "Magnetic Head Suspension Apparatus" which was assigned to Eastman Kodak Company and U.S. Pat. No. 5,034,836 entitled "Magnetic Head Suspension Apparatus For Use With A Photographic Film", which was assigned to Eastman Kodak Company, disclose apparatus for supporting magnetic heads for reading and/or recording information on a magnetic surface of a filmstrip during photofinishing. Information to be read includes information that may have been recorded during film manufacture relating to film speed, emulsion type, etc., and information recorded by the camera relating to exposure and lighting conditions, etc.

With respect to information recorded with a predetermined orientation to the filmstrip edge such as disclosed in U.S. Pat. No. 5,028,940 entitled "Camera Apparatus For Magnetically Recording On Film", which was assigned to Eastman Kodak Company, it is desirable to read the information with a head similarly oriented with respect to the filmstrip edge during photofinishing to accurately read the recorded information. Also, it is desirable for the photofinisher to record information oriented with respect to the film edge and later read such information by means of a head oriented similar to the recording head.

U.S. Pat. Nos. 5,028,940 and 5,034,836, disclose apparatus for supporting magnetic heads with the same orientation relative to the film edge. While the apparatus disclosed is capable of producing highly accurate results, it is mechanically complex and costly to manufacture.

SUMMARY OF THE INVENTION

The present invention overcomes the difficulties of the prior art, by providing a Magnetic Head Suspension Apparatus that accurately positions the longitudinal edges of a filmstrip in a predetermined location relative to one or more magnetic heads intended to read a magnetic surface adjacent to those edges. The invention also centers a filmstrip on a Magnetic Head Suspension Apparatus.

In accordance with the invention, a pivotally mounted means is provided with a pair of edge followers for engaging the opposite longitudinal edges of a filmstrip. At least one magnetic head is attached to the pivotally mounted means in a predetermined orientation with a recording track on the filmstrip. Means are provided for biasing the pivotally mounted means to urge the edge followers into engagement with the opposite filmstrip edges respectively to maintain the orientation of the head with respect to a filmstrip edge during filmstrip transport.

DESCRIPTION OF THE PREFERRED EMBODIMENT

Figure 1:
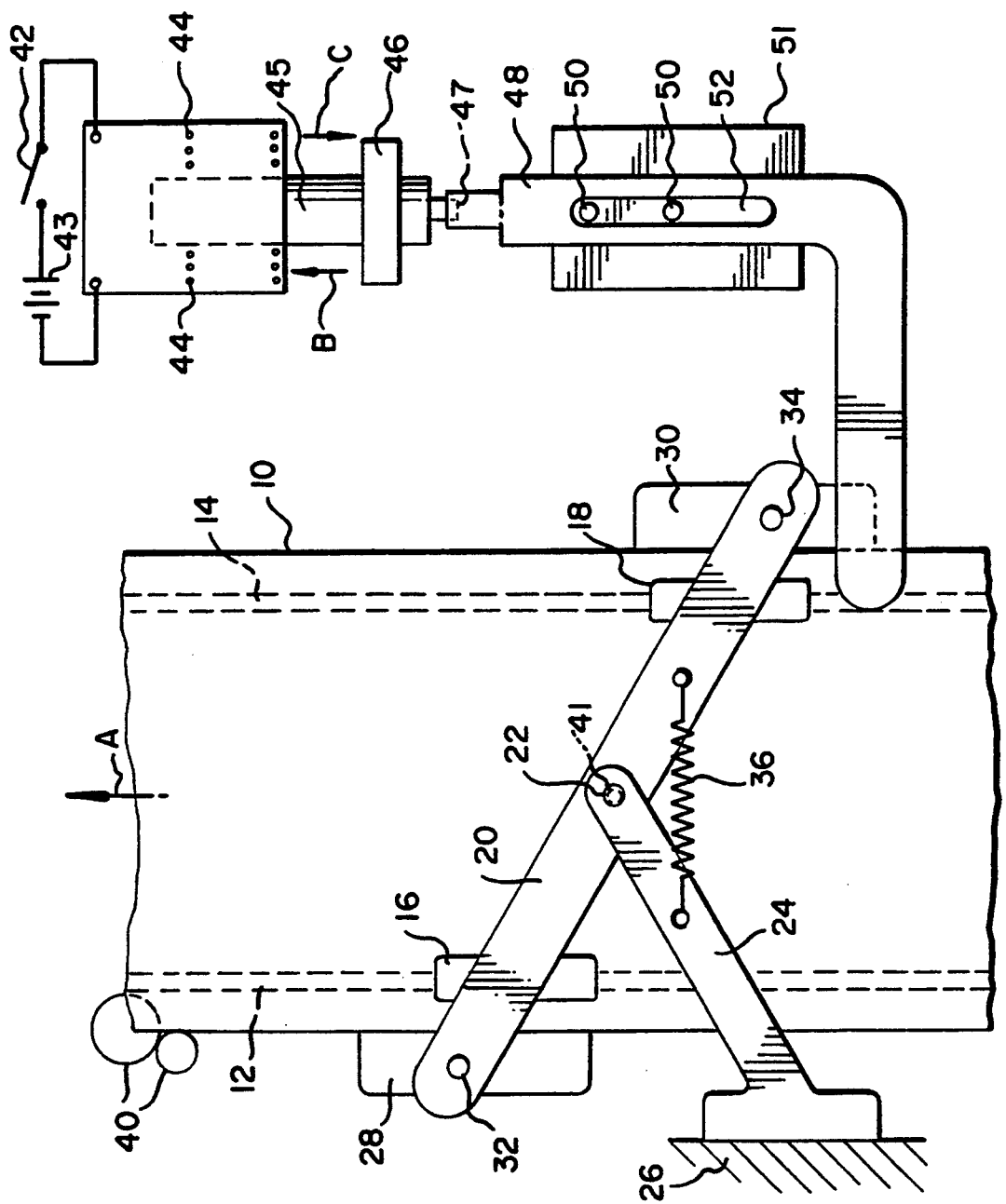
FIG. 1 is a schematic illustration of a head suspension apparatus in accordance with the present invention.

Referring now to the drawings in detail and more particularly to FIG. 1, the reference character 10 represents a photographic filmstrip having information tracks 12 and 14 recorded on magnetic surfaces of filmstrip 10. Preferably, filmstrip 10 is provided with a virtually transparent magnetic coating having dedicated longitudinal regions for recording specific types of information. Since such recording formats form no part of the present invention, further description is deemed unnecessary.

During various photofinishing operations, filmstrip 10 will be transported longitudinally by rollers 40. Rollers 40 are utilized to move filmstrip 10 in the direction indicated by arrow A. Even though accurate transport of filmstrip 10 is accomplished, azimuth variations can occur which cause displacement of the edges of filmstrip 10. Also, filmstrip 10 may vary in width and the edges of filmstrip 10 may have irregularities. Accordingly, during both recording in manufacture and in the camera it is desirable to record the information with heads that are oriented with respect to the edges of filmstrip 10 and during photofinishing to read and record information with heads similarly oriented.

If the information contained in tracks 12 and 14 was thus recorded in a predetermined orientation with respect to the edges of filmstrip 10, then it is desirable to support a pair of magnetic heads 16 and 18 with the same orientation to accurately read the information. To achieve this result, heads 16 and 18 are carried by follower bar 20 pivotally mounted for pivotal movement about an axis perpendicular to and aligned with the longitudinal axis of filmstrip 10 by means of a shaft 22 which couples hole 41 of follower bar 20 to one of the ends of fixed support arm 24. The other end of arm 24 is connected to main supporting structure 26. A pair of film edge followers comprising a pair of pads 28 and 30 are pivotally mounted on the ends of follower bar 20 by shafts 32 and 34, respectively. To complete the assembly, a tension spring 36 has its opposite ends fixed to follower bar 20 and support arm 24, respectively. Because one end of spring 36 is attached to bar 20 in spaced relationship with pivot shaft 22, spring 36 will bias follower bar 20 toward rotation in a clockwise direction as viewed in FIG. 1 to urge edge followers 28 and 30 into firm contact with the edges of filmstrip 10, respectively.

In operation, if the edges of filmstrip 10 are irregular or if filmstrip 10 varies in width, edge followers 28 and 30 will be displaced accordingly causing follower bar 20 to pivot against or with the bias of spring 36, to maintain magnetic heads 16 and 18 accurately located with respect to the edges of filmstrip 10. If tracks 12 and 14 are edge oriented, heads 16 and 18 will accurately read the recorded information. Also, the forces exerted by followers 28 and 30 tend to assist in maintaining filmstrip 10 in its desired path and thus also have advantages in regard to film tracking.

If the photofinisher records information using the apparatus shown in FIG. 1, the information will be accurately oriented with respect to the edges of filmstrip 10. The information may be read later using the same apparatus with extreme accuracy.

When rollers 40 move the last portion of filmstrip 10 past pads 28 and 30, spring 36 will cause shaft 22 to move in hole 41 causing follower bar 20 to move in a clockwise direction causing pads 28 and 30 to move closer together. In order to place a new filmstrip 10 between pads 28 and 30 pads 28 and 30 have to be moved further apart.

The negative terminal of battery 43 is connected to one of the ends of coil 44 and the positive terminal of battery 43 is connected to one of the two terminals of switch 42. The second terminal of switch 42 is connected to the other end of coil 44. One of the ends of plunger 45 is surrounded by coil 44 and the other end of plunger 45 is connected to adapter 46. Pin 47 of adapter 46 is connected to one of the ends of L-shaped bar 48, and the other end of bar 48 is positioned adjacent to bar 20. Pin 50 couples stationary plate 51 to slot 52 of bar 48. Pins 50, plate 51 and slot 52 insure that bar 48 will move in a predetermined direction when plunger 45 moves bar 48.

The closing of switch 42 causes a current from battery 43 to appear in coil 44 and coil 44 to induce a magnetic field. The magnetic field causes plunger 45 to move in the direction indicated by arrow B. Slot 52 of bar 48 will move in the direction indicated by arrow B causing bar 48 to move follower bar 20 in a counterclockwise direction. The above movement will increase the distance between edge followers 28 and 30 permitting one to thread a new filmstrip 10 (the new filmstrip 10 may have a different width than the removed filmstrip 10) between edge followers 28 and 30.

The opening of switch 42 electrically removes battery 43 from coil 44 causing coil 44 to dissipate its magnetic field. The removal of a magnetic field from coil 44 will cause plunger 45 to move in the direction indicated by arrow C. Slot 52 of bar 48 will move in the direction indicated by arrow C causing bar 40 to move away from follower bar 20. Follower bar 20 will then move in a clockwise direction. The above movement will decrease the distance between edge followers 28 and 30 permitting edge followers 28 and 30 to be adjusted to the width of new filmstrip 10.

In the embodiment of FIG. 1 magnetic heads 16 and 18 may pivot significantly relative to information tracks 12 and 14 if bar 20 becomes displaced because of variations in the width of filmstrip 10.

Figure 2:
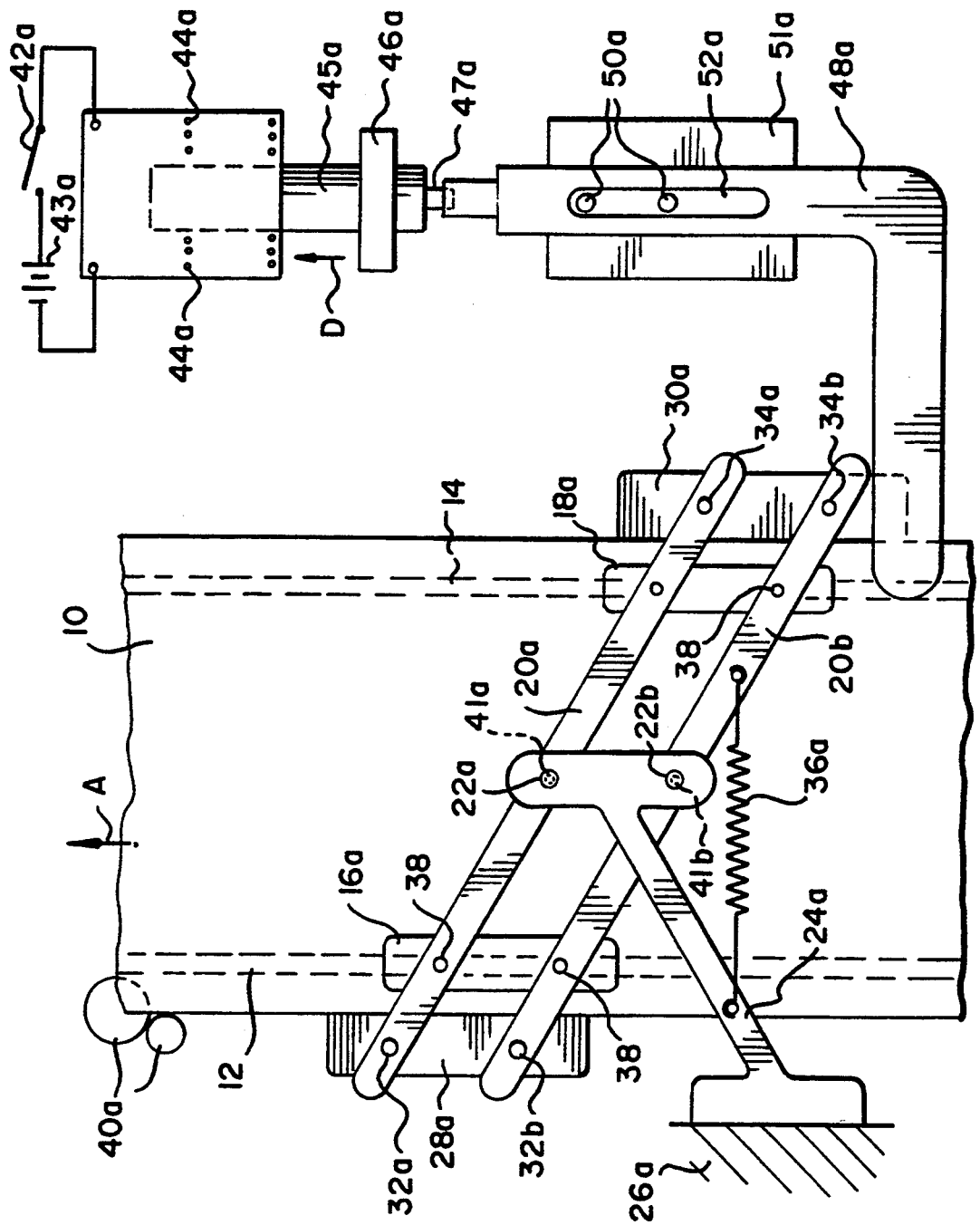
FIG. 2 is a view similar to FIG. 1 showing another embodiment of the invention.

Another embodiment of the invention is shown in FIG. 2 for use with films which during transport have significant width variations. In this embodiment, a filmstrip 10 having information tracks 12 and 14 will be transported longitudinally by rollers 40. Rollers 40 are utilized to move filmstrip 10 in the direction indicated by arrow A. Hole 41a and Hole 41b substantially parallel follower bars 20a and 20b are respectively coupled to one of the ends of support arm 24a by shafts 22a and 22b. The other end of arm 24a is connected to main supporting structure 26a. Bars 20a and 20b are pivotally connected to edge follower 30a by shafts 34a and 34b and bars 20a and 20b are pivotally connected to edge follower 28a by shafts 32a and 32b. Magnetic heads 16a and 16b are pivotally connected to follower bars 20a and 20b by shafts 38. Magnetic heads 16a and 18a are carried by follower bars 20a and 20b and were mounted for pivotal movement about an axis perpendicular to and aligned with the longitudinal axis of filmstrip 10. Tension spring 36a has its opposite ends fixed to follower bar 20b and support arm 24a, respectively. Because one end of spring 36a is attached to bar 20b in spaced relationship with pivot shafts 22a and 22b, spring 36a will bias follower bars 20a and 20b toward rotation in a clockwise direction as viewed in FIG. 2 to urge edge followers 28a and 30a into firm contact with the edges of filmstrip 10 respectively.

In operation of the embodiment shown in FIG. 2 the substantially parallel follower bars 20a and 20b function as a parallelogram linkage. During significant variations in width the axis of the magnetic heads 16a and 18a will remain parallel to the axis extending between the pivot axis of bars 20a and 20b.

When rollers 40a move the last portion of filmstrip 10 past edge follower pads 28a and 30a, spring 36a will cause shafts 22a and 22b to respectively move in slots 41a and 41b causing follower bars 20a and 20b to move in a clockwise direction causing pads 28a and 30a to move closer together. In order to place a new filmstrip 10 between pads 28a and 30a, pads 28a and 30a have to be moved further apart.

The negative terminal of battery 43a is connected to one of the ends of coil 44a and the positive terminal of battery 43a is connected to one of the two terminals of switch 42a. The second terminal of switch 42a is connected to the other end of coil 44a. One of the ends of plunger 45a is surrounded by coil 44a and the other end of plunger 45a is connected to adapter 46a. Pin 47a of adapter 46a is connected to one of the ends of L-shaped bar 48a, and the other end of bar 48a is positioned adjacent to bar 20a. Pins 50a couple stationary plate 51a to slot 52a of bar 58a. Pins 50a, plate 51a and slot 52a insure that bar 48a will move in a predetermined direction when plunger 45a moves bar 48a.

The closing of switch 42a causes a current from battery 43a to appear in coil 44a and coil 44a to induce a magnetic field. The magnetic field causes plunger 45a to move in the direction indicated by arrow D. Slot 52a of bar 48a will move in the direction indicated by arrow D causing bar 48a to move follower bars 20a and 20b in a counterclockwise direction. The above movement will increase the distance between edge followers 28a and 30a permitting one to thread a new filmstrip 10 (the new filmstrip 10 may have a different width than the removed filmstrip 10) between edge followers 28a and 30a.

The opening of switch 42a electrically removes battery 43a from coil 44a causing coil 44a to dissipate its magnetic field. The removal of a magnetic field from coil 44a will cause plunger 45a to move in the direction indicated by arrow E. Slot 52a of bar 48a will move in the direction indicated by arrow E causing bar 48a to move away from follower bars 20a and 20d. Follower bars 28a and 20b in a clockwise direction. The above movement will decrease the distance between edge followers 28a and 30a permitting edge followers 28a and 30a to be adjusted to the width of new filmstrip 10.

It will now be apparent that the invention provides simple, low-cost mechanisms for maintaining orientation of magnetic heads with respect to filmstrip edges. Moreover, the essentially floating follower bar can simultaneously maintain orientation of two or more heads using a single biasing means and two edge followers.

The above specification has described a new and improved magnetic head suspension and follower assembly for reading and/or recording information on a magnetic surface of a photographic filmstrip during photofinishing. It is realized that the above description may indicate to those skilled in the art additional ways in which the principles of this invention may be used without departing from its spirit. It is, therefore, intended that this invention only be limited by the scope of the appended claims.

What is claimed is:

1. Apparatus for supporting at least one magnetic head in a predetermined orientation with at least one information track on a photographic filmstrip, the track having a predetermined orientation with respect to one edge of the filmstrip, said apparatus comprising:
   a support structure;
   means for pivoting in close proximity to the filmstrip, said pivoting in close proximity to the structure;
   at least one magnetic head attached to said pivoting means in a predetermined orientation with respect to the filmstrip track;
   a pair of spaced film edge follower means mounted on said pivoting means for engagement with opposite longitudinal edges of the filmstrip respectively; and
   means for biasing said pivoting means to urge said pair of spaced follower means into engagement with the edges of the filmstrip to maintain the location of said magnetic head with respect to one of the edges of the filmstrip and to assist in centering the filmstrip in its desired path.

2. The apparatus as claimed in claim 1, wherein said pivoting means comprises:
   a first arm extending transversely of the filmstrip in which one end of said arm is pivotally connected to one of said pair of follower means, the other end of said arm is pivotally connected to the remaining one of said pair of follower means, and said head is connected to said arm between said follower means; and
   a second arm in which one end of said second arm is connected to said support and the other end of said second arm is connected to said first arm.

3. The apparatus as claimed in claim 2, wherein said biasing means is a spring that is connected to said first and second arms.

4. Apparatus as claimed in claim 2 wherein said pair of film edge follower means comprises a pair of film engaging pads.

5. Apparatus as claimed in claim 1 wherein the pivot axis for said pivoting means is perpendicular to and substantially aligned with the longitudinal axis of the filmstrip.

6. The apparatus claimed in claim 1, further including means positioned adjacent one of said follower means for relaxing said pivoting means to facilitate the loading of a filmstrip.

7. The apparatus claimed in claim 6, wherein said relaxing means comprises:
   a first member having a first end and a second end, the first end is positioned adjacent to one of said follower means;
   a coil for receiving an electric current to produce a magnetic field;
   a second member having a first end and a second end, the first end of said second member is coupled to the magnetic field and the second end of said second member is connected to the second end of said first member,
   whereby when current flows through said coil, the magnetic field produced by said coil will attract said second member causing said first member and one of said following means to move said pivoting means in a manner that said pair of follower means will move away from the edges of the filmstrip and when no current flows through said coil said first member and one of said following means will move said pivoting means in a manner that said pair of follower means will move towards the edges of the filmstrip.

8. Apparatus for supporting at least one magnetic head in a predetermined orientation with at least one edge of a photographic filmstrip, said apparatus comprising:
   at least one elongated follower bar extending across the filmstrip;
   means for supporting said bar for pivotal movement;
   a pair of edge followers pivotally supported on the ends of said bar respectively for engagement with opposite longitudinal edges of the filmstrip respectively;
   at least one magnetic head supported on said bar in predetermined relationship with one edge of the filmstrip; and
   means for biasing said bar to urge said pair of edge followers into engagement with said edges respectively, whereby during transport of the filmstrip said head will have a substantially consistent orientation with respect to one of the edges of the filmstrip and said means for biasing said bar assists in centering the filmstrip in its desired path.

9. The apparatus claimed in claim 8, further including a second magnetic head that is mounted on said bar in predetermined relationship with the opposite edge of said filmstrip.

10. The apparatus claimed in claim 8, wherein said biasing means comprises a spring connected between said bar and said supporting means.

11. The apparatus claimed in claim 10, further including means positioned adjacent to one of said follower means for relaxing said bar to facilitate the loading of a filmstrip.

12. The apparatus claimed in claim 11, wherein said relaxing means comprises:
   a first member having a first end and a second end, the first end is positioned adjacent to one of said follower means;
   a coil for receiving an electric current to produce a magnetic field;
   a second member having a first end and a second end, the first end of said second member is coupled to the magnetic field and the second end of said second member is connected to the second end of said first member,
   whereby when current flows through said coil, the magnetic field produced by said coil will attract said second member causing said first member and one of said following means to move said bar in a manner that said pair of follower means will move away from the edges of the filmstrip and when no current flows through said coil said first member and one of said following means will move said bar in a manner that said pair of follower means will move towards the edges of the filmstrip.

13. Apparatus for supporting at least one magnetic head in a predetermined orientation with at least one edge of a photographic filmstrip, said apparatus comprising:

a first elongated follower bar extending across the filmstrip;

a second elongated follower bar parallel to said first bar, said second bar extending across the filmstrip;

means for supporting said first and second bars for pivotal movement;

a pair of edge followers pivotally supported on the ends of said first and second bars respectively for engagement with opposite longitudinal edges of the filmstrip respectively;

at least one magnetic head supported on said first and second bars in predetermined relationship with one edge of the filmstrip; and means for biasing said first and second bars to urge said followers into engagement with said edges respectively, whereby during transport of the filmstrip said head will have a substantially consistent orientation with respect to one of the edges of the filmstrip and said means for biasing said first and second bars assists in centering the filmstrip in its desired path.

14. The apparatus as claimed in claim 13, further including a second magnetic head that is mounted on said first and second bars in a predetermined relationship with the opposite edge of said filmstrip.

15. The apparatus as claimed in claim 14 wherein said biasing means comprises a spring connected between said second bar and said supporting means.

16. The apparatus claimed in claim 13, further including means positioned adjacent to one of said follower means for relaxing said first and second bars to facilitate the loading of a filmstrip.

17. The apparatus claimed in claim 16, wherein said relaxing means comprises:

a first member having a first end and a second end, the first end is positioned adjacent to one of said follower means;

a coil for receiving an electric current to produce a magnetic field;

a second member having a first end and a second end, the first end of said second member is coupled to the magnetic field and the second end of said second member is connected to the second end of said first member, whereby when current flows through said coil, the magnetic field produced by said coil will attract said second member causing said first member and one of said following means to move said first and a second bars in a manner that said pair of follower means will move away from the edges of the filmstrip and when no current flows through said coil said first member and one of said following means will move said first and second bars in a manner that said pair of follower means will move towards the edges of the filmstrip.

* * * * *